June 13, 1967 P. O. SWANSON 3,325,027
LUGGAGE RACK
Filed Aug. 4, 1965
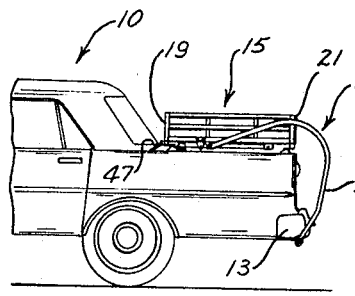
Fig. 1
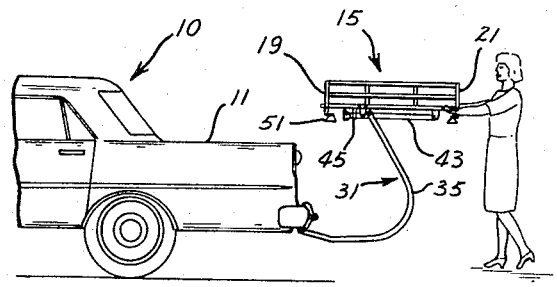
Fig. 2
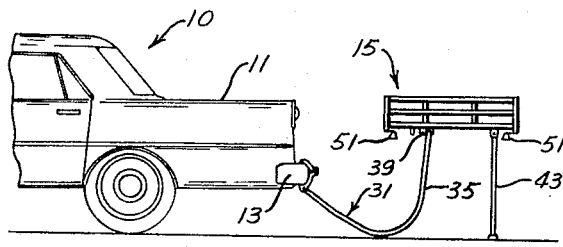
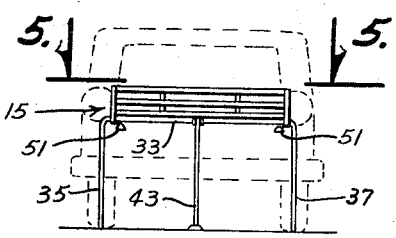
Fig. 4
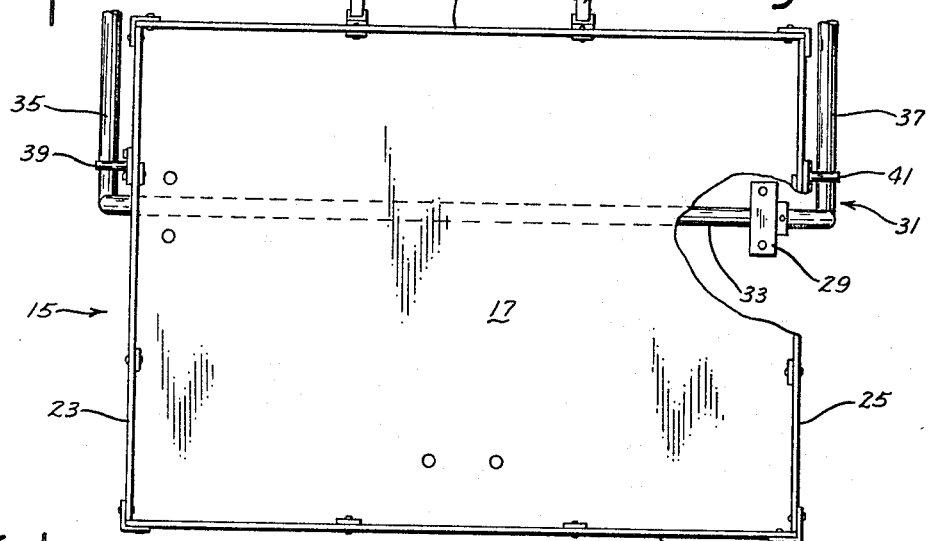
Fig. 3
Fig. 5
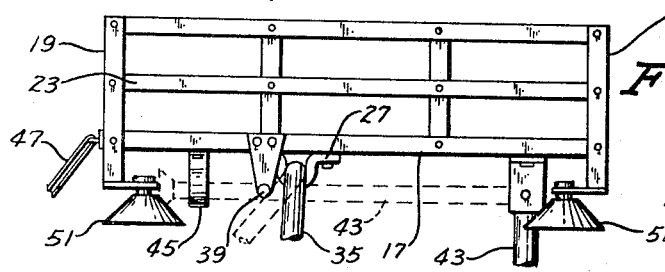
Fig. 6
INVENTOR
PAUL O. SWANSON
BY
Dick, Zarley, McKee & Thomte
ATTORNEYS

United States Patent Office 3,325,027
Patented June 13, 1967

3,325,027
LUGGAGE RACK
Paul O. Swanson, 3515 19th St.,
Columbus, Nebr. 68601
Filed Aug. 4, 1965, Ser. No. 477,112
1 Claim. (Cl. 214—450)

This invention relates to a luggage rack and more particularly to a luggage rack which is pivotally mounted on an automobile so that it may be removed therefrom or replaced thereon with a minimum amount of effort.

Luggage racks are conventionally secured to the tops of automobiles to carry luggage therein. These car top luggage racks create a great deal of air resistance which interferes with the operation of the vehicle. Additionally, the car top luggage racks objectionably raise the center of gravity of the vehicle. Further, the car top luggage racks are difficult to load and unload.

Therefore, it is a principal object of this invention to provide a luggage rack which is pivotally secured to an automobile so that it may be placed on the trunk deck at times and supported above the ground at other times.

A further object of this invention is to provide a luggage rack which is positioned on the trunk deck of the automobile to lessen the air resistance thereof.

A further object of this invention is to provide a luggage rack which does not raise the vehicle center of gravity.

A further object of this invention is to provide a luggage rack which can be removed or replaced from the trunk deck when it is loaded.

A further object of this invention is to provide a luggage rack which can be pivotally removed from or pivotally replaced on the automobile with little effort.

A further object of this invention is to provide a luggage rack which is supported by a folding leg when in the off position.

A further object of this invention is to provide a luggage rack which will serve as a table or the like when in an off position.

A still further object of this invention is to provide a luggage rack which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a fragmentary side view illustrating the luggage rack as it is positioned on the trunk deck of the automobile;

FIG. 2 is a fragmentary side view of the luggage rack as it is being removed from the automobile;

FIG. 3 is a fragmentary side view of the luggage rack when it is in the off position;

FIG. 4 is a rear view of the luggage rack when in an off position;

FIG. 5 is a fragmentary top elevational view of the luggage rack as would be seen on line 5—5 of FIG. 4 with portions thereof cut away to more fully illustrate the invention; and FIG. 6 is a fragmentary side view of the luggage rack as would be seen on line 6—6 of FIG. 5.

The numeral 10 generally designates an automobile having a trunk deck 11 and a rear bumper 13. The numeral 15 generally designates the luggage rack of this invention and includes a bottom 17, front 19, back 21 and opposite sides 23 and 25. Pivotally secured to the lower surface of bottom 17 by means of strap hinges 27 and 29 is an arcuate pipe 31 including a straight portion 33 and arcuate side portions 35 and 37 extending from each end thereof respectively. It should be noted that straight portion 33 is positioned slightly forwardly of the center of gravity of luggage rack 15. The free ends of arcuate side portions 35 and 37 are operatively pivotally connected to rear bumper 13 by any convenient means adjacent the lower edge thereof as best seen in FIGS. 1–3.

Secured to and extending outwardly from side 23 at a point forwardly of straight portion 33 is a pin means 39 which is in the pivotal path of arcuate side portion 33 as best seen in FIG. 6. Secured to and extending outwardly from side 25 at a point forwardly of straight portion 33 is a pin means 41 which is in the pivotal path of arcuate side portion 37.

A supporting leg 43 is pivotally secured at its upper end to the lower surface of bottom 17 adjacent the rearward end thereof (FIG. 6). A leg retaining means 45 is secured to the lower surface of bottom 17 adjacent the forward end thereof and is adapted to detachably receive supporting leg 43 at times as illustrated by the broken lines in FIG. 6.

A pair of strap members 47 and 49 are secured to front 19 of rack 15 by any convenient means and are adapted to extend to suitable anchoring means on the automobile such as eyelets or the like. Luggage rack 15 is provided with a resilient suction cup 51 at each of its corners as illustrated in the drawings.

The normal method of operation is as follows. Assuming that the luggage rack is positioned on the trunk deck 11 and it is desired to remove the luggage rack therefrom it is simply necessary to unfasten straps 47 and 49 and to pivot the rack rearwardly as illustrated in the drawings. Luggage rack 15 can be pivoted rearwardly with ease due to the fact that pipe 31 is secured to luggage rack 15 at a point forwardly of the center of gravity thereof. Luggage rack 15 is pivoted until arcuate sides 35 and 37 engage the ground as seen in FIG. 4. Supporting leg 43 is then detached from leg retaining means 45 and pivoted to a vertical position as illustrated in FIGS. 3 and 4. In this position the rack will not tip and can serve as a table if empty. It can be appreciated that when the luggage rack is in the position seen in FIGS. 3 and 4, access to the trunk of the vehicle and to the rack itself is easily accomplished. The rack is easily pivoted even though it is heavily laden with luggage. Pin means 39 and 41 at each side of luggage rack 15 prevent counter-clock-wise rotation of the luggage rack with respect to pipe 31 which lends stability to the device.

When luggage rack 15 is mounted on the vehicle as seen in FIG. 1, suction cups 51 adhere to trunk deck 11 in conventional fashion. It can be appreciated that the position of luggage rack 15 on the vehicle has taken it out of the air stream and has thereby not created an objectionable air resistance. It should also be noted that the positioning of luggage rack 15 and trunk deck 11 does not objectionably effect the center of gravity of the automobile.

It can be appreciated that the device can be adapted to fit a variety of different vehicles merely by changing the configuration of sides 35 and 37 so that they can conform to the shape of the vehicle. The luggage rack may be completely removed from the automobile by simply detaching the forward ends of sides 35 and 37 from bumper 13.

Thus it can be seen that the device accomplishes all of its stated objectives.

Some changes may be made in the construction and arrangement of my luggage rack without departing from the real spirit and purpose of my invention, and it is my intention to cover by my claim, any modified forms of structure or use of mechanical equivalents which may be reasonably included with its scope.

I claim:

In a luggage carrier for an automobile having a rear bumper and a trunk deck,
- a luggage rack having a bottom, rearward and forward ends and opposite sides,
- a frame means including an elongated straight portion pivotally secured to said bottom of said rack at a point forwardly of the center thereof and extending from one side to the other side of said rack,
- said frame means also including first and second arcuate arm members extending transversely from opposite ends of said straight portion which are adapted to be operatively pivotally secured to said rear bumper,
- said luggage rack having a plurality of securing means on its bottom at said forward and said rearward ends for detachable securement and engagement with said trunk deck,
- said rack and said frame being pivotally movable about said rear bumper from a position with said rack directly over said trunk deck to a position with said forward end of said rack being substantially rearward of said trunk deck,
- a stop means secured to said rack at each side thereof and being in the pivoted path of the arm member adjacent thereto to limit the pivotal movement in one direction of said rack with respect to said straight portion,
- and a foldable supporting leg operatively secured to the bottom of said rack adjacent the rearward end thereof.

References Cited

UNITED STATES PATENTS

| | | | |
|---|---|---|---|
| 2,670,113 | 2/1954 | Ellingson | 214—450 |
| 2,907,483 | 10/1959 | Prag | 214—450 |
| 3,103,289 | 9/1963 | Clary | 214—450 |

FOREIGN PATENTS

| | | |
|---|---|---|
| 658,618 | 2/1963 | Canada. |

HUGO O. SCHULZ, *Primary Examiner.*